(Model.)
E. PRESCOTT & C. H. T. MANN.
CATTLE FASTENER.
No. 313,524. Patented Mar. 10, 1885.
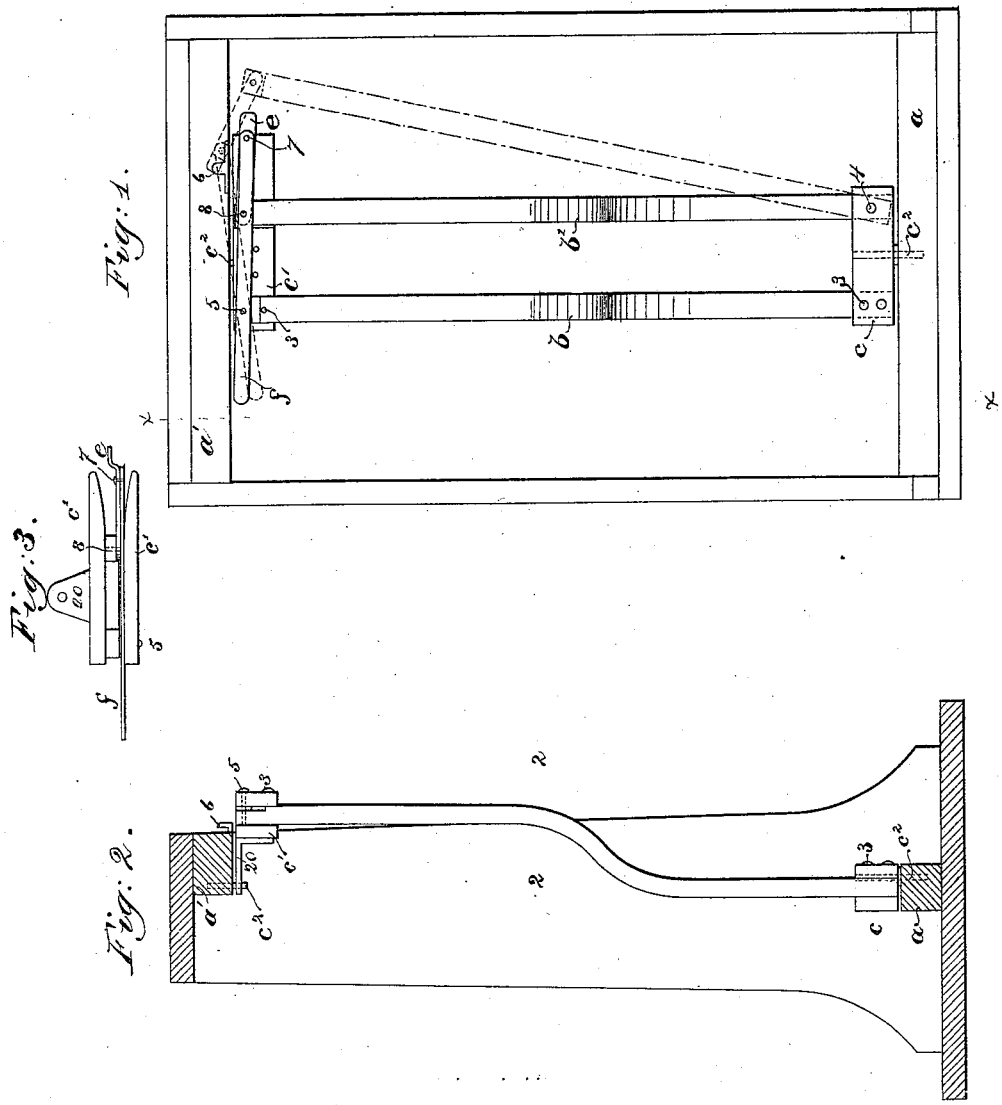
Witnesses,
Henry Marsh.
B. J. Noyes.
Inventor,
Edwin Prescott and
Chas. H. T. Mann.
by Crosby Gregory Atty's.

UNITED STATES PATENT OFFICE.

EDWIN PRESCOTT, OF ARLINGTON, AND CHARLES H. T. MANN, OF METHUEN, MASSACHUSETTS.

CATTLE-FASTENER.

SPECIFICATION forming part of Letters Patent No. 313,524, dated March 10, 1885.

Application filed June 9, 1884. (Model.)

*To all whom it may concern:*

Be it known that we, EDWIN PRESCOTT, of Arlington, county of Middlesex, State of Massachusetts, and CHARLES H. T. MANN, of Methuen, county of Essex, State of Massachusetts, have invented an Improvement in Cattle-Fasteners, of which the following description, in connection with the accompanying drawings, is a specification, like letters on the drawings representing like parts.

This invention is an improvement on that described in United States Patent No. 257,172, dated May 2, 1882, to which reference may be had.

The fastener herein described is composed, essentially, of two bent bars, both of which at top and bottom are joined with swiveling-blocks, one of the said bars being pivoted at one end to one of the said blocks, and having co-operating with its other end at the other block a suitable locking device. By pivoting one of the said bars on one of the blocks it may be separated from the other bar to afford the necessary space for the reception of the animal's head and neck, and when closed together or moved, the one bar toward the other, the two bars co-operate to form a fastening for the animal, the bars remaining at the sides of the neck, back of the head. The blocks being pivoted enable the animal to move its head and neck freely, and the bars being curved forward from near their middle parts downward enable the animal, when about to lie down, to move forward, which is essential to neatness.

Figure 1 is a front elevation of a cattle-fastener embodying our invention, the face of the upper swiveling-block removed, and the said block being shown in this figure and Fig. 3 as composed of several pieces suitably united; Fig. 2, a section of Fig. 1 on the dotted line $x$ $x$; and Fig. 3, a top view of the upper swivel-block and its locking device, the bars being closed together.

The sills $a$ and header $a'$ are supposed to represent part of a stable or building where the animal is to be fastened.

The fastening device is composed of two bars, $b$ $b'$, and two swivel-blocks, $c$ $c'$, each having a pivot, as at $c^2$, in the sill or header. The bars $b$ $b'$ are from about the line 2 2, Fig. 2, the shoulder line of the animal, bent forward and downward to their lower ends, so that as the neck of the animal descends between the bars during the act of lying down the animal may move forward away from the usual gutter behind it. The upper and lower ends of bar $b$ are fixed to the swiveling-blocks $c$ $c'$ by bolts 3; but the lower end of the bar $b'$ is pivoted to the block $c$ by a pin, 4, so that the said bar may be moved away from the bar $b$, as shown by dotted lines in Fig. 1, to offer ample space for the head and neck of the animal to be fastened after it gets into its stall. The upper swivel-block, $c'$, is made open and provided with an oblong slot (see Fig. 3) for the movement therein of the upper end of the bar $b'$, and the upper end of the said bar has pivoted to it at 8 a link, $e$, which latter, at or near its opposite end, is pivoted at 7 to a lever, $f$, the latter lever being pivoted to the block $c'$ at 5. The upper swivel-block, $c$, which holds and receives the upper ends of the two bars, is located, it will be seen, wholly at one side of the center of rotation of the lower swivel-block, and to properly support the said upper swivel-block it has been provided at one side with a projecting ear, 20, which receives through it the pivot about which the upper block turns, the pivots for the upper and lower blocks being in the same vertical line. The header $a'$ is provided with a catch, 6, with which co-operates the end of the link $e$, beyond the pivot 7, which connects it with the lever $f$. When the bar $b'$ is thrown aside, as in dotted lines, the link $e$ is elevated in such position (see dotted line, Fig. 1) that it engages the catch sustained by the header, the said catch preventing the said bars and blocks from turning about the centers $c^2$. After the animal has stepped in position between the bars $b$ $b'$, the bar $b'$ is moved into its full-line position, such movement being accomplished either by pushing directly against the said bar $b'$ or by a quick downward and then upward pull on the projecting end of the lever $f$. When the bar $b'$ is in its full-line position, it is retained there by the lever and link referred to, the pivotal point 7 being at such time in line with or slightly below the pivots 5 and 8, the said lever and link thus forming a locking device for the bar $b'$, and at the same time the said lever and link constitute means for operating one of the said bars toward and from the other and holding the bars from turning together about the pivots $c^3$.

We are aware that a single bent bar held rigidly at both ends has been provided with a yoke to embrace the neck, and that the said yoke has been made movable up and down thereon; but with such bar placed at but one side of the neck cattle confined thereto had too much movement, and it is very difficult to securely retain the single bar in place. By employing with the rigid bent bar a bent bar which is pivoted so as to be moved toward and from it, the yoke has been dispensed with, and the cow may be held more comfortably, but yet in a narrower space both as to width and length. By mounting both the bars on swivel-blocks the cow may move her neck more freely than when her neck is required to sustain the weight of a yoke.

We claim—

1. The swivel-blocks, and their attached bent bars $b\ b'$, one of the said bars being movable with relation to the other, combined with a locking device to hold the movable bar in closed position, to operate substantially as described.

2. The swivel-blocks and attached bars, one of which is pivoted on one of the swivel-blocks, combined with a locking device for the said bars composed of a lever, $f$, and link $e$, having their pivots arranged substantially as described.

3. The swivel-blocks and attached bars and lever $f$, and link $e$, to operate one of the bars, combined with a catch to prevent the rotation of the swivel-blocks, substantially as described.

4. In a cattle-fastener, a lower swivel-block and two attached bent bars, one of which is made movable toward and from the other, combined with an upper swivel-block arranged at one side of the central pivot of the lower swivel-block, and having a laterally-extended ear, which is pivoted in the line of the pivot of the lower swivel-block, to operate substantially as described.

In testimony whereof we have signed our names to this specification in the presence of two subscribing witnesses.

EDWIN PRESCOTT.
CHARLES H. T. MANN.

Witnesses:
G. W. GREGORY,
B. J. NOYES.